United States Patent
Hong et al.

(10) Patent No.: US 6,516,007 B1
(45) Date of Patent: Feb. 4, 2003

(54) METHOD FOR SYNCHRONIZING REVERSE LINK AND TRANSMISSION METHOD USING SYNCHRONOUS REVERSE LINK

(75) Inventors: Een Kee Hong, Seoul (KR); Dong Do Lee, Taejeon (KR); Jun Mo Koo, Taejeon (KR); Sang Yon Lee, Seoul (KR); Sung Jae Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/307,745

(22) Filed: May 10, 1999

(30) Foreign Application Priority Data

Jul. 23, 1998 (KR) .............................. 98-29760

(51) Int. Cl.⁷ .................................................. H04J 3/06
(52) U.S. Cl. ....................................... 370/515; 370/519
(58) Field of Search .............................. 370/431, 441, 370/464, 508, 342, 343, 335, 320, 324, 328–330, 350; 455/502

(56) References Cited

U.S. PATENT DOCUMENTS

| | | | | |
|---|---|---|---|---|
| 5,511,067 A | * | 4/1996 | Miller | 370/18 |
| 6,137,786 A | * | 10/2000 | Ariyoshi | 370/335 |
| 6,266,363 B1 | * | 7/2001 | Hiramatsu | 375/335 |
| 6,310,868 B2 | * | 10/2001 | Uebayashi | 375/335 |
| 2001/0012284 A1 | * | 8/2001 | Uebayashi | 370/342 |

* cited by examiner

*Primary Examiner*—Ajit Patel
*Assistant Examiner*—Chirag Shah
(74) *Attorney, Agent, or Firm*—Lowe Hauptman Gilman & Berner, LLP

(57) ABSTRACT

A transmission method using synchronous reverse links establishes synchronization by controlling transmission times of mobile stations according to synchronization control messages received through a control channel and then controlling the transmission times according to synchronization control bits received through a traffic channel.

9 Claims, 2 Drawing Sheets

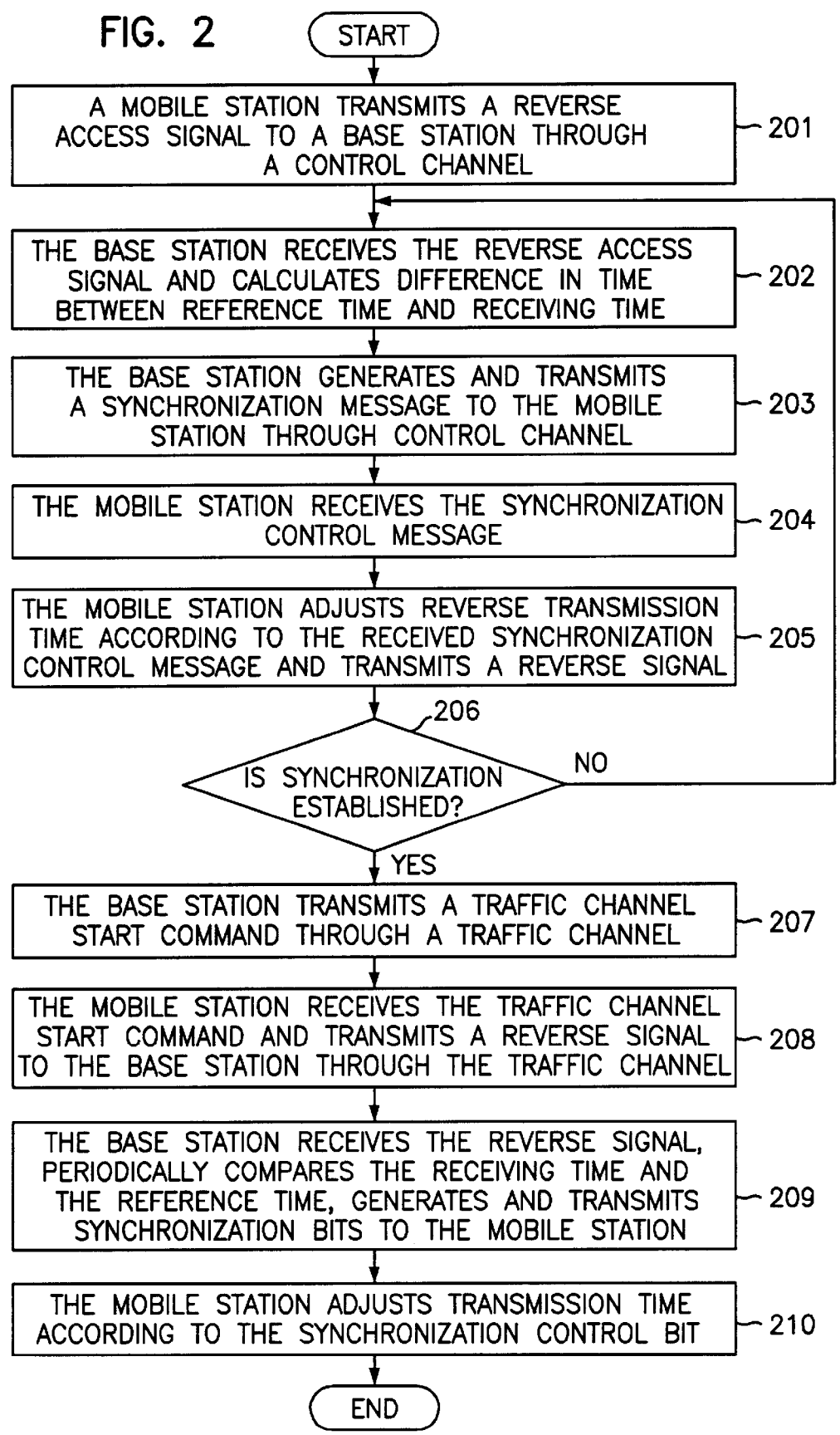

METHOD FOR SYNCHRONIZING REVERSE LINK AND TRANSMISSION METHOD USING SYNCHRONOUS REVERSE LINK

BACKGROUND OF THE INVENTION

1. Technical Field of the Invention

The present invention elates to a method of synchronizing reverse links and a transmission method using synchronous reverse links in a radio communication system.

2. Description of the Prior Art

In a typical Code Division Multiple Access (CDMA) communication system, the interference between forward link channels is considerably reduced because forward link channels are identified by different orthogonal channels. In reverse links, the distance between a base station and each mobile station is different from mobile station to mobile station and the propagation time delays of signals from different mobile stations are also different.

Since the cross correlation values of orthogonal codes are much larger than those of Pseudo Noise (PN) codes when the signals are not synchronized with each other, the reverse link channels of Interim Standard-95 (IS-95) are identified by different PN codes. However, if channels can be synchronized with each other in reverse links and the channels are identified by orthogonal codes, the interference between reverse channels can be reduced considerably.

Also, there is a method to synchronize reverse channels where the receiving times of a forward synchronization channel and a reverse synchronization channel (that is, pilot channels) are used to set up synchronization and then synchronization control messages are transmitted through a forward traffic channel to maintain synchronization.

However, in the conventional method as described above, there are some disadvantages that separate synchronization channel establishment is required, the throughput of the traffic channel is degraded, and the transmission of control signals is delayed due to the transmission of the synchronization control messages through the traffic channel.

SUMMARY OF THE INVENTION

Therefore, an object of the present invention is to provide a transmission method using synchronous reverse links where a mobile station controls its transmission time to establish reverse link synchronization according to synchronization control messages received through a conventional control channel, and the mobile station controls its transmission time according to synchronization control bits received through a traffic channel of the mobile station.

According to one aspect of the present invention, this and other objects are accomplished by a method of establishing reverse channel synchronization, including the steps of: a) transmitting, from a mobile station, an access signal to a base station through a control channel; b) receiving, at the base station, the reverse access signal, calculating the difference in time between a reference time and the receiving time, generating and transmitting a synchronization control message to the mobile station through a control channel; and c) adjusting, at the mobile station, the reverse transmission time and transmitting a reverse link signal to the base station.

According to another aspect of the present invention, the above and other objects are accomplished by a transmission method using synchronous reverse channels in a wireless communication system, including the steps of a) transmitting, from a mobile station, an access signal to a base station through a control channel; b) receiving, at the base station, the reverse access signal, calculating the difference in time between a reference time and the receiving time, generating and transmitting a synchronization control message to the mobile station through the control channel; c) adjusting, at the mobile station, the reverse transmission time and establishing synchronization by transmitting a reverse link signal to the base station; d) transmitting, from the base station, a traffic channel start command to the mobile station through a traffic channel; e) transmitting, from the mobile station, data to the base station through the traffic channel; D periodically comparing, at the base station, the receiving time with the reference time, generating and transmitting a synchronization control bit to the mobile station through the traffic channel; and g) controlling, at the mobile station, a transmission time according to the synchronization control bit.

BRIEF DESCRIPTION OF THE DRAWINGS

Other objects and aspects of the invention will become apparent from the following description of preferred embodiments with reference to the accompanying drawings in which:

FIG. 2 is a flow chart illustrating a reverse link synchronization transmission method in accordance with the present invention.

DETAILED DESCRIPTION OF THE PREFERRED EMBODIMENTS

Figure 1:
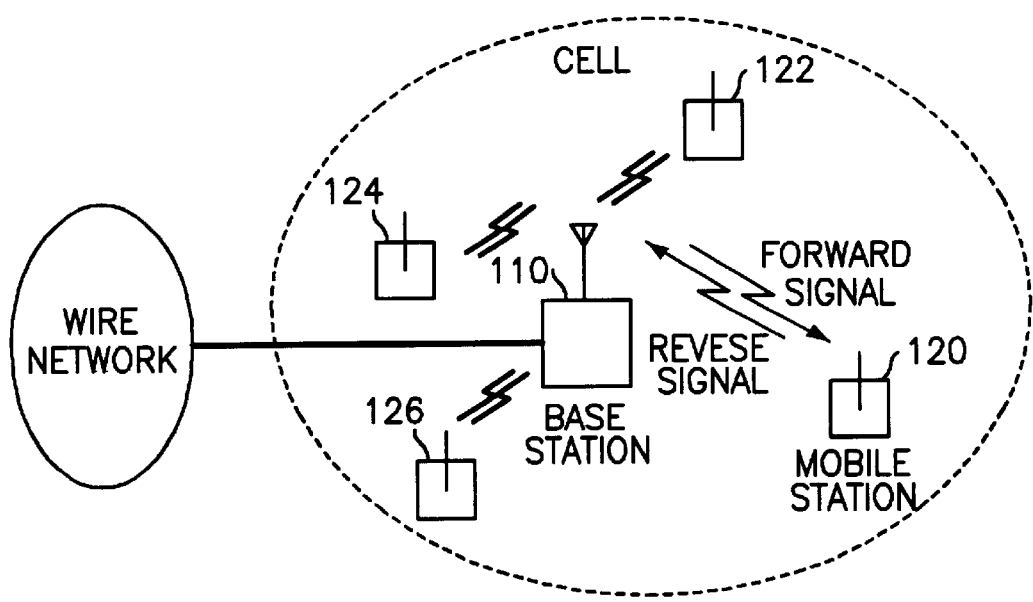
FIG. 1 is an exemplary diagram of a radio communication system in which the present invention is used.

In the present invention, a control message for reverse channel synchronization is generated and transmitted to a mobile station through a conventional control channel without establishing a separate control channel for reverse channel synchronization. The control message for reverse channel synchronization is generated by comparing the receiving time (e.g. the starting point of a reverse channel receiving frame) of a reverse channel signal with a reference time (e.g. the starting point of a forward channel transmission frame).

Since all channels are synchronized with each other in forward links, the starting point of the transmission frame can be used as a reference time.

Also, in the present invention, a reference time establishment method for reverse synchronization, a transmission method of a command to synchronize reverse link channels, and a code constitution method for reverse channel discrimination will be described.

In the reference time establishment method for reverse channel synchronization in accordance with the present invention, the median value between the maximum and minimum round trip delays is selected as a reference time. A reference time is selected as described above in order to reduce the range where a mobile station should control a transmission time to be synchronized with the reference time.

In other words, if the starting point of the transmission frame of a forward channel is selected as the reference time, the receiving time from a mobile station is placed between the i reference time and the maximum round trip delay. In this case, the range of timing which should be controlled by a remote mobile station corresponds to the maximum round trip delay. However, if the median value of the maximum round trip delay is selected as a reference time, the maximum range which should be controlled is reduced in half.

In the present invention, two methods for transmitting a synchronization control bit for closed loop synchronization control will be described.

One method is to transmit a reverse synchronization control bit instead of a power control bit, because fast control is not required for the synchronization of reverse channels as compared to the conventional closed loop power control. For example, we assume that the control period of the conventional closed loop power control is 0.5 msec (0.625 msec in Japan W-CDMA system) and that of reverse channel synchronization is 10 msec, then every 20th power control bit is replaced with a reverse channel synchronization control bit and the mobile station performs the reverse channel synchronization control by regarding every 20th power control bit as the reverse channel synchronization control bit.

The other method is to insert the reverse channel synchronization control bit before channel coding.

If the power control bit is inserted before channel coding, accurate power control is difficult due to a large time delay associated with the channel coding and interleaving. Therefore, the power control bit is inserted after channel coding and interleaving.

Since fast control for reverse channel synchronization is not required, a base station can insert and transmit the reverse channel synchronization control bit before channel coding, and the mobile station extracts the reverse channel synchronization control bit after channel decoding which results in more accurate synchronization. In other words, since the mobile station extracts the synchronization control bit after obtaining channel coding effect, more accurate synchronization can be performed.

Reverse channels are discriminated by different pseudo noise codes in conventional methods. In other words, each mobile station spreads and transmits data by using its own pseudo noise code. When using the synchronous reverse channel transmission method, each channel should be discriminated by a orthogonal code. When only orthogonal codes are used for channel identification, the interference from multipaths and asynchronous channels becomes large since the cross correlation values between orthogonal codes are very large. In the present invention, reverse channels are discriminated by both pseudo noise codes and orthogonal codes to avoid increased interference.

All channels share an identical pseudo noise code in a common sector or cell, and a channel in the sector or cell is discriminated by an orthogonal code. In this case, since the channels are spread by the pseudo noise code and the orthogonal codes, the interference between channels can be greatly reduced as compared to the case when the channels are discriminated by only the orthogonal codes.

Since the number of orthogonal codes is limited, if a number of channels to be discriminated in a system is larger than the number of orthogonal codes available, it is difficult to provide more orthogonal codes to the system. In the present invention, if another channel should be discriminated after all orthogonal codes have already been assigned, another pseudo noise code is used. If another pseudo noise code is assigned when the orthogonal codes are not enough, there is interference between channels spread by different pseudo noise codes. However, the problem associated with the shortage of orthogonal codes can be solved.

The preferred embodiments of the present invention will be described with reference to the accompanying drawings.

FIG. 1 is an exemplary diagram of a radio communication system in which the present invention can be used.

The radio communication system includes a base station 110 and mobile stations 120, 122, 124 and 126.

In the radio communication system, a cell is an unit area in which the base station 110 can communicate with the mobile stations 120, 122, 124 and 126 through the radio network. The mobile stations 120, 122, 124 and 126 are portable devices. The base station 110 is a stationary device which communicates with mobile stations 120, 122, 124 and 126. One base station is placed in a cell.

FIG. 2 is a flow chart illustrating the reverse link synchronization transmission method in accordance with the present invention.

A mobile station transmits a reverse channel access signal through a control channel to a base station at step 201. The base station receives the reverse channel access signal and calculates the difference in time between a reference time and the receiving time of the reverse channel access signal at step 202. The mobile station generates and transmits a synchronization control message to the mobile station through the control channel at step 203.

After receiving the synchronization control message at step 204, the mobile station adjusts its reverse transmission time according to the synchronization control message and then transmits a reverse signal to the base station at step 205.

The base station determines whether initial synchronization has been established or not at step 206. If so, the base station transmits a command for starting transmission of traffic data through a traffic channel. If not, the process returns to the step 202 where the mobile station calculates the difference in time between the reference time and the receiving time of the reverse channel access signal.

The mobile station receives the command for starting transmission of traffic data and transmits a reverse signal through the traffic channel at step 208. The base station receives the reverse signal and periodically generates and transmits synchronization control bits to the mobile station by comparing the reference time with the receiving time at step 209. Then the mobile station adjusts the transmission time according to the synchronization control bits at step 210.

The present invention controls the reverse transmission time according to the synchronization control bits received through the traffic channel after reverse channel synchronization has been achieved by adjusting the reverse transmission time according to the synchronization control message received through the control channel. The method described in the present invention allows for an increase in the number of channels in a cell or sector by using orthogonal codes and reverse link synchronization. Also, there is an effect that the quality of communication is considerably improved by using orthogonal codes and pseudo noise codes together as spreading codes with small correlation values.

Although the preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method of establishing reverse channel synchronization, comprising the steps of:
    a) transmitting, from a mobile station, a reverse access signal to a base station through a control channel;
    b) receiving, at the base station, the reverse access signal, calculating the difference in time between a reference time and the receiving time of the reverse access signal, and, based on the calculated time difference, generating and transmitting a synchronization control message to the mobile station through a control channel; and c) adjusting, at the mobile station, a reverse transmission time according to the synchronization control message, and transmitting a reverse link signal to the base station;

wherein the reference time is a median value between the maximum and the minimum round trip delays associated with a cell radius of the base station.

2. The method as claimed in claim 1, wherein the base station repeatedly performs steps b) and c) if the synchronization has not been established.

3. A transmission method using synchronous reverse channels in a wireless communication system, said method comprising the steps of:

a) transmitting, from a mobile station, a reverse access signal to a base station through a control channel;

b) receiving, at the base station, the reverse access signal, calculating the difference in time between a reference time and the receiving time of the reverse access signal, and, based on the calculated time difference, generating and transmitting a synchronization control message to the mobile station through the control channel;

c) adjusting, at the mobile station, a reverse transmission time according to the synchronization control message, and establishing reverse channel synchronization by transmitting a reverse link signal to the base station;

d) transmitting, from the base station, a traffic channel start command to the mobile station through a traffic channel;

e) transmitting, from the mobile station, data to the base station through the traffic channel;

f) periodically comparing, at the base station, the receiving time of the data with the reference time, and, based on the comparison, generating and transmitting a synchronization control bit to the mobile station through the traffic channel; and g) controlling, at the mobile station, a subsequent transmission time according to the synchronization control bits;

wherein the reference time is a median value between the maximum and the minimum round trip delays associated with a cell radius of the base station.

4. The method as claimed in claim 3, wherein multiple channels connecting multiple said mobile stations, which are located in the cell or sector associated with said base station, to said base station share an identical pseudo noise code, and each of the channels in the sector or the cell is discriminated by an uniquely assigned orthogonal code and transmits a reverse signal.

5. The method as claimed in claim 3, wherein the step e) includes the steps of assigning another pseudo noise code, and generating and transmitting a reverse signal when all available orthogonal codes have already been assigned and more channels are necessary to be discriminated.

6. The method as claimed in claim 3, wherein the synchronization control bit is transmitted on the traffic channel instead of a power control bit.

7. The method as claimed in claim 3, wherein the reverse synchronization control bit is inserted before channel coding to enable the mobile station to accurately extract the synchronization control bit.

8. A transmission method using synchronous reverse channels in a wireless communication system, said method comprising the steps of:

a) transmitting, from a mobile station, a reverse access signal to a base station through a control channel;

b) receiving, at the base station, the reverse access signal, calculating the difference in time between a reference time and the receiving time of the reverse access signal, and, based on the calculated time difference, generating and transmitting a synchronization control message to the mobile station through the control channel;

c) adjusting, at the mobile station, a reverse transmission time according to the synchronization control message, and establishing reverse channel synchronization by transmitting a reverse link signal to the base station;

d) transmitting, from the base station, a traffic channel start command to the mobile station through a traffic channel;

e) transmitting, from the mobile station, data to the base station through the traffic channel;

f) periodically comparing, at the base station, the receiving time of the data with the reference time, and, based on the comparison, generating and transmitting a synchronization control bit to the mobile station through the traffic channel; and g) controlling, at the mobile station, a subsequent transmission time according to the synchronization control bits;

wherein multiple channels connecting multiple said mobile stations, which are located in the cell or sector associated with said base station, to said base station share a common identical pseudo noise code, and each of the channels in the sector or the cell is discriminated by an uniquely assigned orthogonal code.

9. The method as claimed in claim 8, wherein another pseudo noise code is assigned to at least one of the channels when the number of channels in the cell or sector is larger than the number of available orthogonal codes and all of the available orthogonal codes have already been assigned.

* * * * *